Dec. 7, 1971  P. R. VOSS ET AL  3,624,912
HYPERBOLIC PLOTTER
Filed Nov. 12, 1969  2 Sheets-Sheet 1
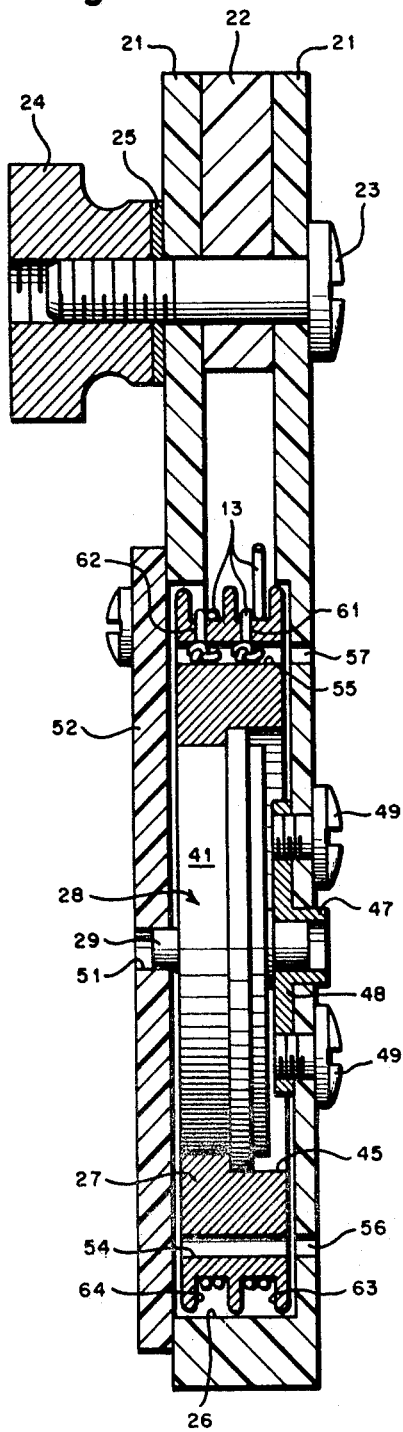
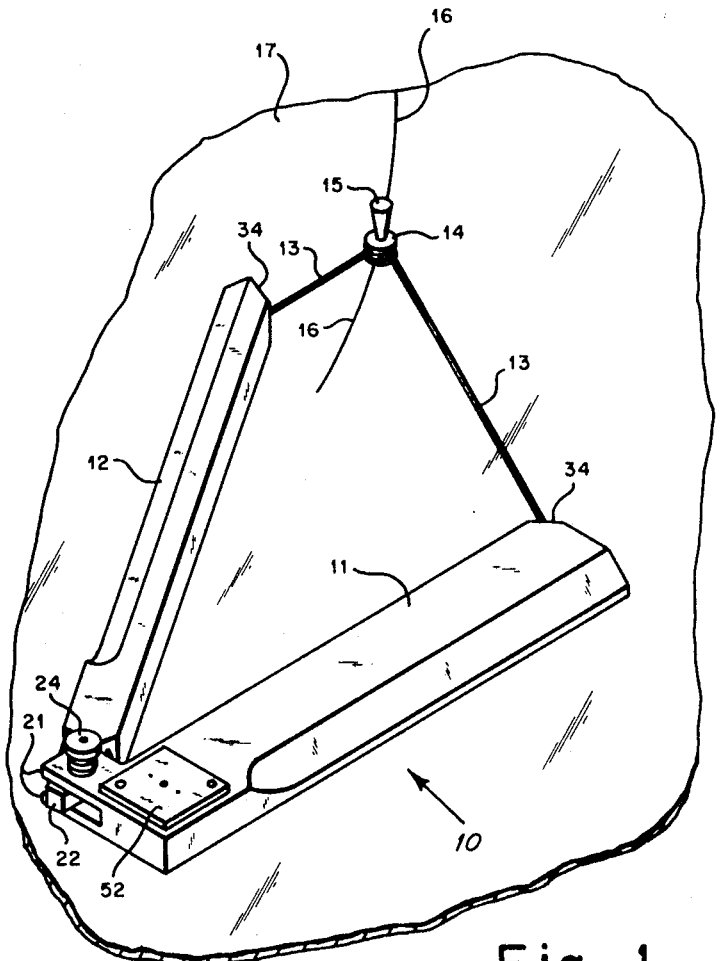
INVENTORS
PAUL R. VOSS
WILLIAM E. BURNS, JR.
BY
ATTORNEYS

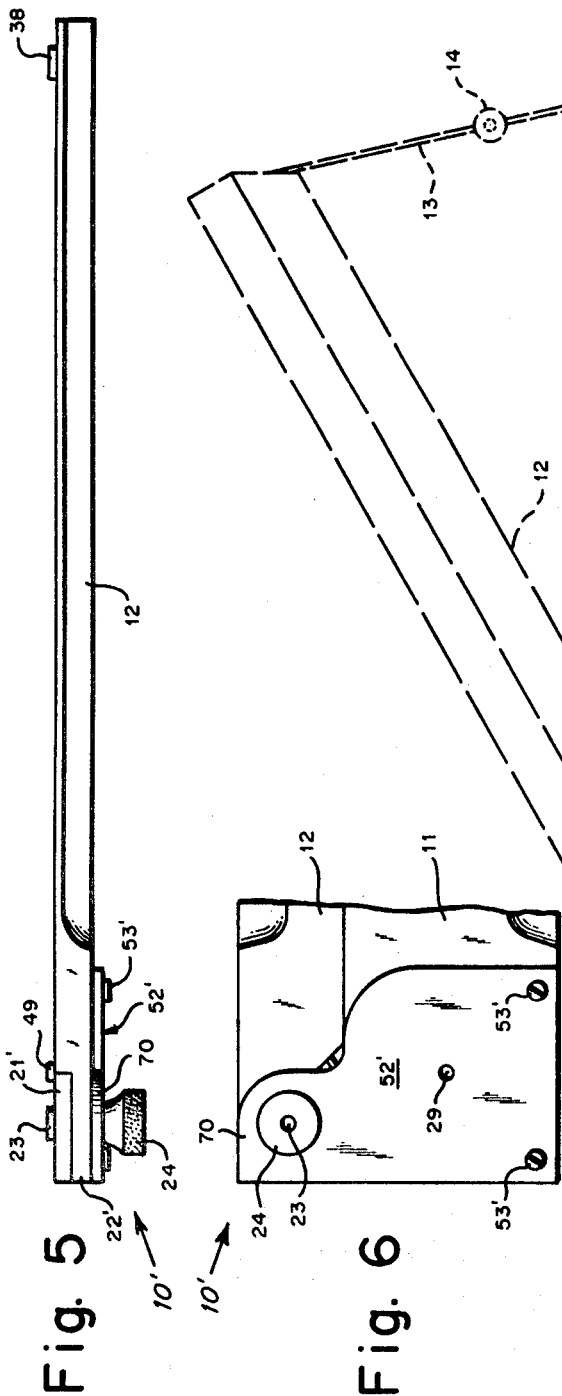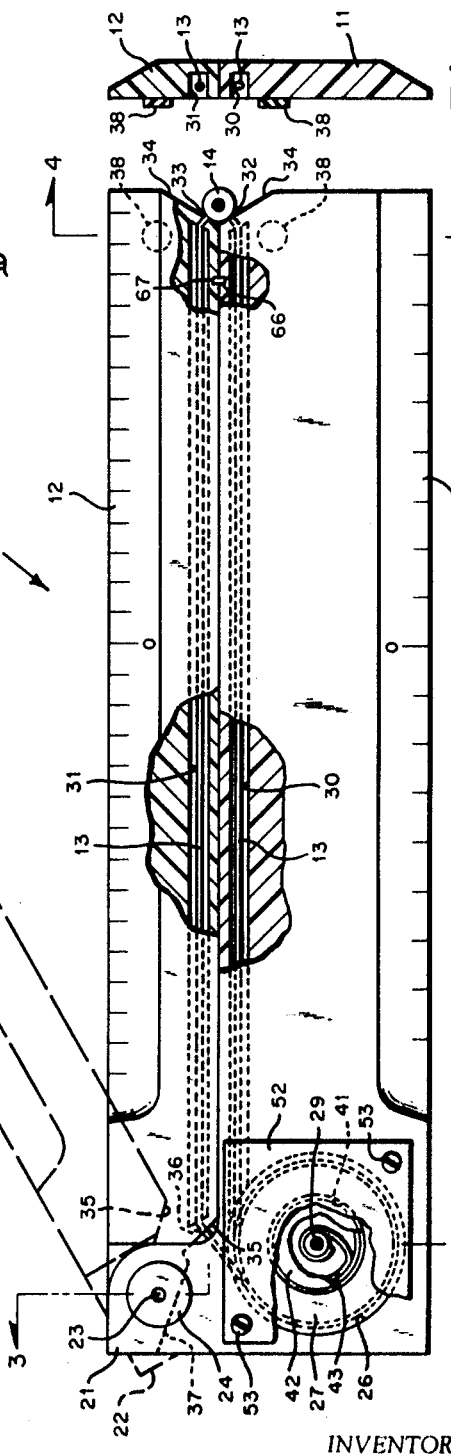

United States Patent Office 3,624,912
Patented Dec. 7, 1971

3,624,912
HYPERBOLIC PLOTTER
Paul R. Voss, Ann Arbor, Mich., and William E. Burns, Jr., Chalfont, Pa., assignors to the United States of America as represented by the Secretary of the Navy
Filed Nov. 12, 1969, Ser. No. 875,705
Int. Cl. B43l *11/02*
U.S. Cl. 33—27 H                                    11 Claims

ABSTRACT OF THE DISCLOSURE

A portable drafting instrument for plotting hyperbolas foldable into a rectangular rule-like configuration comprising a pair of arms each having longtudinally extending channels through which is threaded a respective end of a pencil or pen guide-carrying string and each having a tab projecting from one end thereof to which is pivotally connected that of the other to permit registration of ports at the free ends of the arms from which the string issues with hyperbola foci. The string ends are connected to a spool mounted for rotation about an arbor fixed to one of the arms coaxially of a spool receiving cavity against or under the action of an interior helical spring. The guide comprises a tubular cylinder terminating in spaced apart, radially projecting flanges and has the portion of the string issuing between the arms threaded through its medial portion so that the string can be internally crimped by insertion of a pencil or pen point therethrough for retaining the guide in a substantially fixed, eccentricity determining position relative to the string.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to line scribers and, more particularly to hyperbola scribers.

When determining the location of a target relative to three sonobuoys located in known, spaced-apart positions, it has heretofore been the practice to use compasses in order to derive a plurality of points defining a hyperbola leg which is the loci of points at which a sound source may be located relative to two of the sonobuoys in consideration of the relative signal strengths received by each. The intersection of the hyperbolas constructed by different pairings of the sonobuoy locations determine the fix or point at which the sound reflective or sound emitting target is probably located. While instruments for plotting hyperbolas are known, such equipment as is known is relatively bulky, takes up valuable space in an aircraft, is somewhat difficult to manipulate or is costly to manufacture.

SUMMARY OF THE INVENTION

It is the general purpose of this invention to provide an improved, portable, more easily used, inexpensively manufactured instrument for plotting, drawing or scribing hyperbolas. Briefly, the general purpose and other objects of the invention are accomplished by providing a hyperbola plotter having the form of rectangular rule when in closed or folded position which includes a pair of pivotally connected arms one of which carries a spring-loaded, spool to which are connected the ends of a string threaded through longitudinally extending channels or grooves formed in the arms. The portion of the string extending between the arms is threaded through a pencil or pen guide comprising a tubular cylinder having flanged ends and a centarl aperture sized to receive a pencil lead or pen point which can crimp the string against the interior of the guide for fixedly positioning the guide relative to the string to establish the desired eccentricity for the hyperbola leg to be scribed. Additionally, the spool includes a pair of eccentrically located bores or channels extending therethrough which are registerable with apertures in the bottom wall defining the spool cavity in one of the arms, one of which permits locking off the spool against rotation under the action of a helical spring to facilitate assembly and the other of which contains the knotted ends of the string which extends therefrom through apertures to the annular periphery of the spool and thence through the grooves or channels in the arms. The particular arrangement of the plotter components enables fabrication of a portable plotter of minimal thickness which can be easily and quickly used to accurately plot hyperbolas of selectively variable eccentricities.

BRIEF DESCRIPTION OF THE DRAWING

FIG. 1 represents an isometric view of a plotter arranged on a chart for scribing a hyperbola thereon;

FIG. 2 represents an enlarged plan view of the plotter of FIG. 1 in folded condition having superimposed thereon in dotted line the position of one arm moved to establish a spread apart condition for drawing a hyperbola;

FIG. 3 represents a further enlarged cross-sectional view of the hinged end of the plotter taken generally along 3—3 of FIG. 2;

FIG. 4 represents a cross-sectional view of the other end of the plotter taken generally along line 4—4 of FIG. 2;

FIG. 5 represents a side view of a modified form of the plotter according to the invention;

FIG. 6 represents a top view of the pivotally connected end of the modified plotter of FIG. 5; and FIG. 7 represents an enlarged view in cross section of a pencil guide of the plotter of FIG. 1.

DESCRIPTION OF THE PREFERRED EMBODIMENTS

Referring now to FIG. 1 the scriber or plotter generally designated 10 includes a pair of generally elongated rectangular flat arms 11 and 12 pivotally connected or hinged together and having a string 13 extending between and withdrawable from a common string supply through the free ends of the arms 11 and 12. The arms 11 and 12 are conveniently machined or injection molded from a plastic material. The portion of the string 13 extending between the free ends of the arms 11 and 12 is threaded through a normally movable pencil guide 14 formed for insertion therethrough of a pencil lead 15 or other scribing means for scribing a hyperbola 16 on a chart 17 upon which both the hinged portion and the free ends of the plotter 10 are laid. More particularly, a pair of spaced apart tabs 21 extend in registration with each other orthogonally from the hinged end of the arm 11 and slidably receive therebetween a trapezoidal tab 22 extending generally longitudinally of the arm 12. The tabs 21 and 22 are pivotally connected together by a bolt 23 and ferruled nut 24 seated on a washer 25 as shown in FIGS. 2 and 3. The nut 24 is tightened to maintin the arms 11 and 12 in a desired spread apart condition against the tendency of the string 13 to be fully withdrawn into the arms 11 and 12 thereby pulling the free ends toward each other, as hereinafter explained.

As shown in FIG. 2, the arms 11 and 12 have generally rectangular configurations so that the outer longitudinal edges of the plotter 10 when in collapsed or folded condition are parallel. The arm 11 is wider than the arm 12 so that a truncated circular spool receiving cavity 26 communicating with the interior longitudinal side of the arm 11 may be formed therein adjacent the tabs 21 for receiving an annular string storage spool 27 in turn carried by a spring-loaded barrel assembly 28 rotatably mounted on an arbor 29 fixed coaxially within the cavity 26 to the arm 11. The bottom or chart-confronting sides of the arms 11 and 12 have longitudinally extending channels or grooves 30 and 31 formed therein adjacent the interior longitudinal sides of the arms 11 and 12, communicating with the cavity 26 and terminating at the free ends of the arms 11 and 12 in ports 32 and 33 through which issues the string 13 having its ends connected to the spool 27.

The confronting portions of the free ends of the arms 11 and 12 are beveled as at 34 to form a generally triangular notch not only sized for receiving the pencil guide 14 but also configured for permitting interference free movement of the string 13 from the ports 32 and 33 during use of the plotter 10, the points of string egress being registered with the foci of the hyperbola to be drawn. The ports 32 and 33 should have diameters sufficiently greater than that of the string 13 so that the string 13 can be easily threaded and freely moved therethrough while the positions of string egress remain substantially fixed while moving the guide 14 to draw a hyperbola. It has been found convenient to use jeweled bores for the above purpose, i.e., using coaxially apertured, cylindrical non-plastic inserts countersunk in bores communicating with the grooves 30 and 31 to reduce the bore diameters and reduce friction and wear.

As shown in FIG. 2, the groove 30 extends longitudinally of the arm 11 and generally tangentially of the circular cavity 26. The interior side of hinged end of the arm 12 is beveled as at 35 and has a port 36 communicating with the groove 31 formed therein through which the string 13 is threaded for connection to the spool 27. The end of the tab 22 confronting the arm 11 is also beveled as at 37 to impart the trapezoidal shape thereto so that the tab 22 does not engage the string 13 when the arms 11 and 12 are spread apart. A pair of circular rubber pads 38 are secured as by cementing to the bottom sides of the free ends of the arms 11 and 12 adjacent the ports 32 and 33.

Referring to FIG. 3, the barrel assembly 28 includes a generally cylindrical cup or barrel 41 closed by a circular lid 42 as shown in FIG. 2 and mounted for rotation upon the coaxially arranged arbor 29 which may have an enlarged medial portion seated between bosses (not shown) protruding from the barrel bottom and the lid 42. As shown in FIG. 2, the interior end of a helically wound spring 43 is connected to the arbor 29 as by an interlocking slot and key, the outermost end being connected to the barrel 41. The annular spool 27 has an axially arranged cavity 45 formed for receiving the barrel assembly 28 in substantially non-slipping engagement therewith. A press fit is suitable for preventing the relative rotation between the spool 27 and the barrel assembly 28. While suitable spring loaded barrel assemblies are commercially available, it is to be understood that the barrel 41 could be formed integrally with the spool 27, i.e., the spool could have a spring receiving cavity formed therein. The spring 43 is arranged so that the barrel 41 and the spool 27 are normally urged to rotate in a direction to take up string 13 through the arms 11 and 12 and withdraw the guide 14 into engagement with the arms 11 and 12.

In order to support the arbor 29 in fixed position relative to the arm 11, one end of the arbor 29 is attached as by a press fit in a boss 47 which projects downwardly through an aperture in the bottom wall of the arm 11 coaxially of the cavity 26 from an integral disc 48 connected to the bottom of the cavity 26 by bolts 49 threaded through the bottom wall of the arm 11 into the disc 48. The other end of the arbor 29 protruding from the barrel assembly 28 is inserted within a circular aperture 51 formed in a cover plate 52 which is sized to close the cavity 26 and which is attached by bolts 53 threaded into the arm 11, protecting the rotatable spool 27 in the cavity 26.

A pair of circular apertures or bores 54 and 55 extend through the spool 27 parallel to its axis in diametrically opposite locations adjacent the spool's annular periphery which are registerable with a pair of circular apertures 56 and 57 extending through the bottom wall of the arm 11 as shown in FIG. 3. The aperture 57 is arranged adjacent the interior longitudinal side of the arm 11. Circular apertures 61 and 62 formed in the spool 27 each provide communication between the bore 55 and a respective one of a pair of spaced apart string tracks or grooves 63 and 64 extending around the annular spool periphery. The ends of the string 13 are threaded through the apertures 61 and 62 and knotted in order to connect the string to the spool 27, the knots being retained in the bore 55.

As shown in FIG. 2, a peg 66 projecting from the interior side of arm 11 is receivable within a slightly misaligned bore 67 formed in the confronting side of arm 12 adjacent the free end thereof. The peg 66 is used to retain the arms 11 and 12 in parallel, abutting relation and facilitates use of the plotter 10 as a rule. As shown in FIGS. 1 and 2, the major portions of the outer longitudinal edges of the arms 11 and 12 are beveled and conveniently have scales indicated thereon and corresponding to one or two scales of charts with which the plotter is ordinarily used.

An alternative embodiment 10' shown in FIGS. 5 and 6 has arms 11 and 12 better configured for use of injection molding techniques in forming the arms 11 and 12. Therein the two spaced apart tabs 21 are replaced by a single tab 21' having a bottom surface contiguous with that of the arm 11. The top surface of the tab 22' is generally contiguous with the top surface of the arm 12'. The spool cavity cover 52' has been reconfigured to include a tab portion 70 extending in an overlying, spaced relationship with the tab 21' for receiving the pivotally connected tab 22' therebetween. In such a configuration the peg 66 can be conveniently replaced by an integrally molded tongue projecting from one arm toward the other and receivable in a slightly misaligned slot molded or machined in the other arm.

The pencil guide 14 as more clearly shown in FIG. 7 comprises a tubular cylinder 71 of annular cross section having diametrically opposed, transversely registerd apertures 72 formed in its medial portion through which the string 13 is threaded and having a pair of annular flanges 73 projecting radially outwardly of its ends in spaced relation a distance for slidably receiving the string 13 therebetween. The central aperture 74 of the guide is sufficiently large to permit a pencil point 15 to pass therethrough while crimping the string 13 against the interior wall of the cylinder 71 as shown in FIG. 7 to fix the guide position relative to the string 13.

The usefulness of the apertures 56 and 57 in the arm 11 and the bores or channels 54 and 55 in the spool 27 may be made more apparent in the context of assembling the plotter 10. It has been found convenient to first pivotally connect the arms 11 and 12 together with the nut 24 and bolt 23. Thereafter, the arbor 29 of the barrel assembly 28 which has been press fitted into the cavity 45 in the spool 27 is fixed to the arm 11 as by force fitting one end thereof into the boss 47 of the connecting disc 48 bolted to the arm 11. The spool 27 is then rotated in a clockwise direction relative to FIG. 2 to tighten the helical spring 43 and to pay string out for a number of turns exceeding that required to store string 13 thereon when the arms 11 and 12 are in collapsed, abutting relation. A locking pin (not shown) is inserted through the aperture 56 in registry with the bore 54 to lock off the spool 27 from counterclockwise rotation under the action of the spring 43. The string 13 is first threaded through the guide 14. Its ends are then threaded through the ports 32 and 33 and along the grooves 30 and 31 toward the spool cavity 26, are threaded through the apertures 61 and 62 in the spool 27, are fished out as with tweezers through respective ends of the bore 55 and are tied off in knots. The locking pin is withdrawn from the bore 54 while holding the string 13 taut, withdrawing the knots into the bore 55, and the spool 27 is allowed to take up the string 13 issuing from the ports 32 and 33 so that the plotter 10 assumes the collapsed position as shown in FIG. 2. The guide 14 is therefore withdrawn by spring action against the arms 11 and 12.

Since both ends of the string 13 are stored on similarly diametered portions of the same spool, both ends of the string 31 may be withdrawn and taken up at the same rate. When the arms 11 and 12 are spread to register the ports 32 and 33 with the foci of the hyperbola to be sketched, the location of the guide 14 along the length of the string 13 extending between the arms 11 and 12 determines the eccentricity of the particular hyperbola being sketched. Since the plotter 10 is laid flat on the chart 17, it is easy to manipulate the plotter arms 11 and 12 with one hand. The pads 38 not only level the plotter 10 but prevent slipping of the free ends of the arms 11 and 12 while the string 13 is being withdrawn or taken up during use of the plotter 10 to draw hyperbolas. Of course, in order to draw the other side of the hyperbola, it may be necessary to rotate the plotter 10 180°, register its ports 32 and 33 with the foci and reposition the guide 14 to establish the desired eccentricity. The portable plotter 10 as described above is of an improved, simplified construction, may be inexpensively fabricated and takes up no more valuable space as in an aircraft than does a conventional rule.

Obviously many modifications and variations of the present invention are possible in view of the above teachings. It is therefore to be understood that within the scope of the appended claims the invention may be practiced otherwise than as actually described.

What is claimed is:

1. A plotter comprising:
first and second arms having ends pivotally connected together and having free ends;
a spool cavity formed in said first arm;
a string storage spool mounted for rotation within said cavity;
a port formed in said free end of each said arm communicating with said spool cavity;
a string having its ends threaded through said ports of said arms and connected to said spool;
spring means connected for urging said spool to rotate in a direction to take up said ends of said string connected thereto; and
guide means including a tube having coaligned holes in the medial portion receiving said string therethrough and sized to receive a marker for crimping said string within the interior of said tube having threaded therethrough a porton of said string extending between said free ends of said arms for positioning the marker along said string portion.

2. A plotter according to claim 1 further comprising:
an arbor having an end fixed to said first arm coaxially of said spool cavity;
said spool being mounted rotatably about said arbor; and
said spring means including a helically wound spring arranged within said spool and having its ends connected respectively to said spool and to said arbor.

3. A plotter according to claim 1 further comprising:
said arms having flat, elongated, rectangular configurations;
a first tab fixed to and projecting transversely from said first arm at said pivotally connected end; and
a second tab fixed to and extending longitudinally from said second arm at said pivotally connected end and being pivotally connected to said first tab.

4. A plotter according to claim 3 further comprising:
a pair of slip inhibiting discs each connected to the bottom side of a respective said arm adjacent said free end.

5. A plotter comprising:
first and second arms having flat, elongated, rectangular configurations, including a first tab fixed to and projecting transversely from said first arm at one end thereof, a second tab fixed to and extending longitudinally from said second arm at one end thereof pivotally connected to said first tab, and having free ends the confronting portions thereof being beveled to form a triangular notch when said arms are juxtaposed in abutting relation;
a spool cavity formed in said first arm;
a spring storage spool mounted for rotation within said cavity;
a port formed in said beveled surface of said free end of each said arm communicating with said spool cavity;
a string having its ends threaded through said ports of said arms and connected to said spool;
spring means connected for urging said spool to rotate in a direction to take up said ends of said string connected thereto; and
guide means having threaded therethrough a portion of said string extending between said free ends of said arms for positioning a marker along said string portion.

6. A plotter according to claim 5 further comprising:
the bottom wall of said first arm having formed therethrough a first aperture communicating with the interior of said spool cavity adjacent the other said arm;
said spool having a pair of spaced apart annular string storage grooves formed to circumscribe its lateral periphery and having a channel extending longitudinally therethrough in a position registerable with said first aperture in said bottom wall;
a pair of apertures formed in said spool each providing communication between a respective said groove and said longitudinally extending channel; and
said ends of said string being threaded through said apertures and terminating in knots disposed within said longitudinally extending channel.

7. A plotter according to claim 6 further comprising:
said bottom wall of said first arm having formed therethrough a second aperture communicating with said interior of said spool cavity in spaced relation to said first aperture; and
said spool having formed therein a locking pin channel extending longitudinally thereinto and positioned for registration with said second aperture when said longitudinally extending spool channel is registered with said first aperture in said bottom wall.

8. A plotter according to claim 7 further comprising:
said arms having elongated, flat rectangular configurations and being positionable in an abutting, coplanar, parallel extending relationship;
a first tab fixed to and projecting transversely from said first arm at said pivotally connected end;
a second tab fixed to and extending longitudinally from said second arm at said pivotally connected end and being pivotally connected to said first tab;
said first arm having formed in the bottom side thereof a groove extending longitudinally of said first arm adjacent said second arm and tangentially of said spool cavity for providing communication between said port and said spool cavity;
said spool cavity being truncated and communicating with the exterior of said first arm adjacent said second arm;
said second arm having formed in the bottom side thereof a groove extending longitudinally of said second arm adjacent said first arm and terminating adjacent said free end in said port and adjacent said truncated spool cavity in a third port; and said string being threaded through said ports and said grooves.

9. A plotter according to claim 8 further comprising:
a cover connected for closing said spool aperture and including a tab portion extending in spaced registration with said first tab for receiving said second tab therebetween;
a bolt extending through said first and second tabs and said tab portion for pivotally connecting said arms together;
a nut threaded onto said bolt protruding from said tab portion of said cover for establishing a pivotal connection of variable stiffness;
a pair of slip inhibiting discs each connected to the bottom side of a respective said arm adjacent said free end; and
confronting portions of said free ends of said arms being beveled to form a triangular notch in an end of said plotter when said arms are juxtaposed in abutting relation, said ports being formed to extend through the beveled portions of said free ends.

10. A plotter according to claim 9 further comprising:
a projection extending from one said arm toward the other said arm adjacent said free ends; and
a misaligned aperture formed in said other said arm for receiving and releasably retaining said projection to retain said arms in parallel, abutting relation.

11. A plotter comprising:
first and second arms pivotally connected in common at one end thereof and having free ends;
a spring loaded storage spool mounted for rotation on said first arm;
string guide means formed at the free ends of said arms;
a string having its ends threaded through said string guide means and connected to said spool for spring take-up thereon; and
marker guide means comprising a tube including co-aligned holes extending through the walls thereof having said string threaded therethrough, the central axes of said holes being in a plane containing the central axis of said tube and substantially normal thereto, the inner diameter of said tube being sized to receive a marker displacing said string against the walls of said tube, whereby the string is crimped against said tube.

References Cited

UNITED STATES PATENTS

| 2,385,827 | 10/1945 | McKaba | 33—27 H |
| 2,548,039 | 4/1951 | Morgan | 33—30 E |

FOREIGN PATENTS

| 285,746 | 7/1915 | Germany | 33—30 E |

OTHER REFERENCES

Sutton: "An Instrument for Drawing Confocal Ellipses and Hyperbolas," p. 253—American Mathematical Monthly—April 1943.

HARRY N. HAROIAN, Primary Examiner